United States Patent
Nakajima et al.

(10) Patent No.: US 11,203,184 B2
(45) Date of Patent: Dec. 21, 2021

(54) ILLUMINATION DEVICE AND VEHICLE GLASS UTILIZATION METHOD

(71) Applicant: Sekisui Chemical Co., Ltd., Osaka (JP)

(72) Inventors: Daisuke Nakajima, Takatsuki (JP); Yuusuke Oota, Moriyama (JP); Atsushi Nohara, Kusatsu (JP); Sho Fujioka, Kyoto (JP); Masashi Yanai, Okayama (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 16/753,568

(22) PCT Filed: Oct. 9, 2018

(86) PCT No.: PCT/JP2018/037625
§ 371 (c)(1),
(2) Date: Apr. 3, 2020

(87) PCT Pub. No.: WO2019/073982
PCT Pub. Date: Apr. 18, 2019

(65) Prior Publication Data
US 2020/0298533 A1    Sep. 24, 2020

(30) Foreign Application Priority Data
Oct. 10, 2017    (JP) .............................. JP2017-197213

(51) Int. Cl.
*B32B 17/10* (2006.01)
*B60Q 3/208* (2017.01)
(Continued)

(52) U.S. Cl.
CPC .......... *B32B 17/10541* (2013.01); *B32B 7/12* (2013.01); *B32B 17/10669* (2013.01);
(Continued)

(58) Field of Classification Search
CPC ................ B32B 17/10541; B32B 7/12; B32B 17/10669; B32B 2605/08; B60Q 3/208
See application file for complete search history.

(56) References Cited

U.S. PATENT DOCUMENTS 9,568,659 B2    2/2017 Verger et al.
9,845,047 B1   12/2017 Salter et al.
(Continued)

FOREIGN PATENT DOCUMENTS

DE    20 2013 000 685    2/2013
DE    20 2017 103 060    6/2017
(Continued)

OTHER PUBLICATIONS

JP2003-53908, machine translation, Feb. 2003 (Year: 2003).*
(Continued)

*Primary Examiner* — Tracie Y Green
(74) *Attorney, Agent, or Firm* — Wenderoth, Lind & Ponack, L.L.P.

(57) ABSTRACT

A lighting device includes a light source configure to irradiate excitation light and a vehicle glass configured to emit visible light through incident radiation of the excitation light, in which the vehicle glass is configured to emit the visible light synchronously in an area of 30% or more by irradiation with the excitation light.

14 Claims, 3 Drawing Sheets

(51) Int. Cl.
  *B60Q 3/68* (2017.01)
  *B32B 7/12* (2006.01)
  *F21V 9/32* (2018.01)
  *B60Q 3/80* (2017.01)
  *F21W 106/00* (2018.01)
  *F21W 107/10* (2018.01)
  *B60J 1/08* (2006.01)
  *B60J 1/18* (2006.01)

(52) U.S. Cl.
  CPC .............. *B60Q 3/208* (2017.02); *B60Q 3/68* (2017.02); *F21V 9/32* (2018.02); *B32B 2250/40* (2013.01); *B32B 2307/422* (2013.01); *B32B 2551/00* (2013.01); *B32B 2605/08* (2013.01); *B60J 1/08* (2013.01); *B60J 1/18* (2013.01); *B60Q 3/80* (2017.02); *F21W 2106/00* (2018.01); *F21W 2107/10* (2018.01)

(56) References Cited

U.S. PATENT DOCUMENTS

| | | | | |
|---|---|---|---|---|
| 2007/0098969 | A1* | 5/2007 | Ansems | B32B 17/10761 428/212 |
| 2007/0115673 | A1* | 5/2007 | Chen | B62D 25/06 362/459 |
| 2013/0288061 | A1* | 10/2013 | Kitano | B32B 17/10018 428/437 |
| 2015/0168619 | A1* | 6/2015 | Ohmoto | B32B 17/10761 359/359 |
| 2015/0353003 | A1 | 12/2015 | Salter et al. | |
| 2016/0318278 | A1* | 11/2016 | Nakayama | B32B 27/365 |
| 2016/0368246 | A1* | 12/2016 | Yamaguchi | B32B 27/22 |
| 2017/0136742 | A1* | 5/2017 | Oota | B32B 27/36 |
| 2017/0334342 | A1 | 11/2017 | Dellock et al. | |
| 2018/0086260 | A1* | 3/2018 | Barillot | B60Q 3/16 |
| 2018/0170251 | A1* | 6/2018 | Snider | B60Q 3/76 |
| 2019/0001875 | A1* | 1/2019 | Xu | B60Q 3/64 |

FOREIGN PATENT DOCUMENTS

| | | |
|---|---|---|
| DE | 20 2017 104 683 | 8/2017 |
| FR | 2 856 180 | 12/2004 |
| JP | 8-272321 | 10/1996 |
| JP | 2000-356950 | 12/2000 |
| JP | 2003-53908 | 2/2003 |
| JP | 2006-312420 | 11/2006 |

OTHER PUBLICATIONS

International Search Report dated Jan. 8, 2019 in International (PCT) Application No. PCT/JP2018/037625.
Extended European Search Report dated May 11, 2021 in European Patent Application No. 18866114.4.

* cited by examiner

ILLUMINATION DEVICE AND VEHICLE GLASS UTILIZATION METHOD

TECHNICAL FIELD

The present invention relates to a lighting device utilizing glass for a vehicle such as a car, and a vehicle glass utilization method.

BACKGROUND ART

In cars and the like, a car interior light provided at a roof in the car interior is generally used for lighting the car interior. However, the car interior light needs space for setting up thereof at the roof, and there is a limit to the size thereof, and therefore it is difficult to light the entire car interior with sufficient illuminance.

Conventionally, it has been proposed in, for example, JP 2006-312420 A that a light source for car interior lighting is provided on a basal plate of car audio, and light emitted from the light source is led into the car interior to be used instead of a car interior light or used as an auxiliary light.

SUMMARY OF INVENTION

Technical Problem

However, it is difficult to light the entire car interior with sufficient illuminance using the light source disclosed in JP 2006-312420 A. Such an idea that an auxiliary light is installed separately from the car interior light may be conceived, but it is not practical because the car interior space is narrowed. Accordingly, a lighting device capable of lighting the entire car interior with sufficient illuminance without narrowing the interior space has been desired.

The present invention has been devised in view of the circumstances described above, and an object thereof is to provide a lighting device capable of lighting the interior inside a vehicle such as a car with sufficient illuminance without narrowing the interior space in the vehicle.

Solution to Problem

As a result of diligent studies, the inventors have found that the aforementioned problems can be solved by making a vehicle glass capable of emitting visible light through incident radiation of excitation light and allowing the vehicle glass to emit the light in a predetermined area or larger to utilize the vehicle glass as a lighting device, thereby accomplishing the present invention below.

That is, the present invention provides [1] to [14] below.
[1] A lighting device comprising:
 a light source irradiating excitation light; and
 a vehicle glass emitting visible light through incident radiation of the excitation light, wherein the vehicle glass emits the light synchronously in an area of 30% or more by irradiation with the excitation light.
[2] The lighting device according to [1], wherein the vehicle glass is a window glass.
[3] The lighting device according to [2], wherein the window glass is a window glass for a roof.
[4] The lighting device according to any one of [1] to [3], wherein the vehicle glass is a car glass.
[5] The lighting device according to [4], wherein the vehicle glass is any one of a rear glass, a side glass, and a window glass for a roof
[6] The lighting device according to any one of [1] to [5], wherein the vehicle glass comprises a transparent plate.
[7] The lighting device according to [6], wherein
 the vehicle glass has a multilayer structure comprising a laminate of at least one transparent plate and a resin film, and
 the resin film comprises a resin and a fluorescent material capable of emitting visible light through incident radiation of excitation light.
[8] A vehicle glass utilization method using a light source irradiating excitation light and a vehicle glass emitting visible light through incident radiation of the excitation light to allow the vehicle glass to emit the light synchronously in an area of 30% or more by irradiation with the excitation light, thereby utilizing the vehicle glass as lighting.
[9] The vehicle glass utilization method according to [8], wherein the vehicle glass is a window glass.
[10] The vehicle glass utilization method according to [9], wherein the window glass is a window glass for a roof.
[11] The vehicle glass utilization method according to any one of [8] to [10], wherein the vehicle glass is a car glass.
[12] The vehicle glass utilization method according to [11], wherein the vehicle glass is any one of a rear glass, a side glass, and a window glass for a roof.
[13] The vehicle glass utilization method according to any one of [8] to [12], wherein the vehicle glass comprises a transparent plate.
[14] The vehicle glass utilization method according to [13], wherein the vehicle glass has a multilayer structure comprising a laminate of at least one transparent plate and a resin film, and
the resin film comprises a resin and a fluorescent material capable of emitting visible light through incident radiation of the excitation light.

Advantageous Effects of Invention

The present invention can provide a lighting device capable of lighting the interior inside a vehicle such as a car with sufficient illuminance without narrowing the interior space in the vehicle.

DESCRIPTION OF EMBODIMENTS

Figure 1:
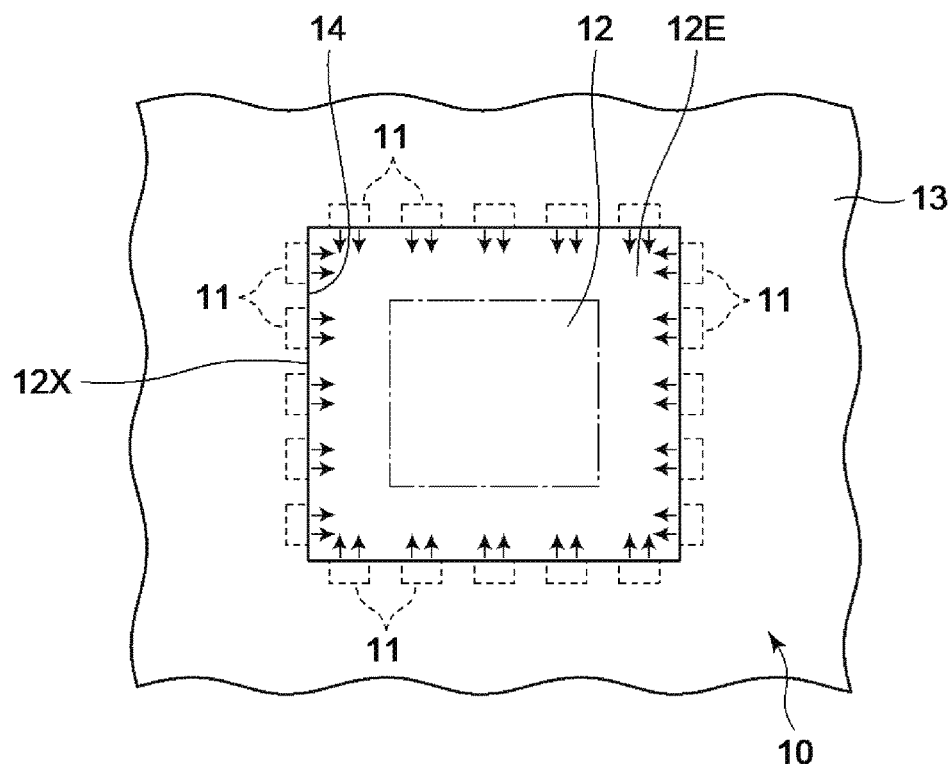
FIG. 1 is a schematic plan view showing a lighting device according to the first embodiment of the present invention.

The embodiments of a lighting device and a vehicle glass utilization method of the present invention will be illustrated below by referring to the drawings.

FIG. 1 shows a lighting device 10 according to the first embodiment of the present invention. In this embodiment, a vehicle glass is utilized for lighting therein, and the lighting device 10 includes: light sources 11 that irradiate with excitation light; and a vehicle glass 12. In this embodiment, the vehicle glass 12 is a window glass, and is more specifically a window glass for a roof provided at a roof 13 of a car.

As shown in FIG. 1, the vehicle glass 12 is installed in, for example, an opening 14 provided at a roof 13 of a car. The vehicle glass 12 is supported by, for example, a frame provided at the inner edge of the opening 14, but may be supported by the roof 13 in any form. The vehicle glass 12 can emit visible light through incident radiation of excitation light by containing a fluorescent material or the like.

The light sources 11 are provided in the periphery of the vehicle glass 12. The light sources 11 are attached to, for example, the frame that supports the vehicle glass 12 provided at the inner edge of the opening 14, but may be provided in the periphery of the vehicle glass 12 in another configuration. A plurality of light sources 11 are provided so as to surround the vehicle glass 12. As shown in FIG. 1, the excitation light emitted from the light sources 11 enters from the outer peripheral surface 12X sides of the vehicle glass 12, and the vehicle glass 12 emits light by the excitation light.

Laser light sources, LED light sources, Xenon lamps, and the like are used for the light sources 11. The excitation light irradiated from the light sources 11 needs only to be able to allow the vehicle glass 12 to emit visible light through its incident radiation into the vehicle glass 12.

The maximum emission wavelength of the light irradiated from the light sources 11 is not specifically limited, but is preferably 420 nm or less, more preferably 410 nm or less, further preferably 408 nm or less. Further, it is preferably 300 nm or more, more preferably 350 nm or more, further preferably 380 nm or more.

By adjusting the maximum emission wavelength of the light irradiated from the light sources 11 to such a lower limit or more and such an upper limit or less, the vehicle glass 12 can emit visible light more efficiently by the excitation light from the light sources 11.

Figure 2:
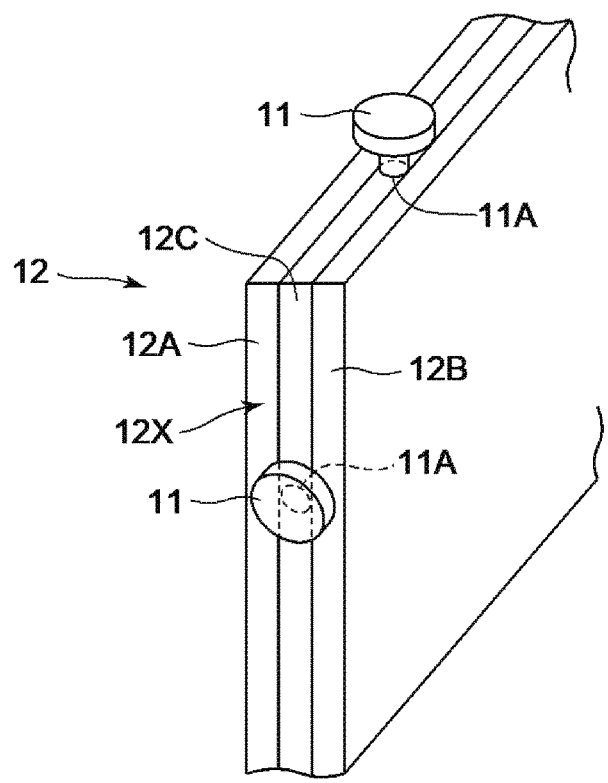
FIG. 2 is a perspective view showing the detailed structure of a lighting device according to the first embodiment of the present invention.

FIG. 2 is a perspective view showing the detailed structure of a lighting device according to the first embodiment. As shown in FIG. 2, the vehicle glass 12 is, for example, laminated glass including two transparent plates 12A and 12B, and an interlayer 12C disposed therebetween, in which the transparent plates 12A and 12B are bonded by the interlayer 12C. In the vehicle glass 12, the interlayer 12C may be composed of a resin film containing a fluorescent material (light emitting layer) or may include two or more resin films at least one of which is a resin film containing a fluorescent material (light emitting layer). However, the vehicle glass 12 is not limited to such a configuration, and any configuration may be employed as long as at least one of its layers is a light emitting layer that emits light, as will be described in detail below.

As shown in FIG. 2, the light sources 11 may be provided so that their output ends 11A are opposed to the outer peripheral surfaces 12X of the vehicle glass 12. Further, the output ends 11A of the light sources 11 are preferably disposed so as to be opposed to or in contact with the light emitting layer of the vehicle glass 12 (in FIG. 2, the interlayer 12C), in order to enhance the light emission efficiency in the vehicle glass 12.

Further, in the case when the interlayer 12C having a light emitting layer is provided between the two transparent plates 12A and 12B, the plurality of light sources 11 may be, for example, composed of LED chips and disposed between the transparent plates 12A and 12B on the outer peripheral surfaces 12X or in the vicinity of the outer peripheral surfaces 12X. In such a case, the light sources 11 may be, for example, attached to the transparent plates 12A and 12B or embedded in the interlayer 12C. Further, diffusion lenses or the like may be provided on the output ends 11A of the light sources 11, so that the light from the light sources 11 is diffused and enters the vehicle glass 12.

Here, the excitation light enters from the outer peripheral surface 12X sides so that the light penetrates into the vehicle glass 12 with the amount of light being attenuated. Accordingly, the amount of light of the visible light emitted from the vehicle glass 12 is relatively high in the vicinity of the outer peripheral surface 12X, and the amount of the light is reduced as the excitation light penetrates inward, so that the light emission from the vehicle glass 12 has a gradation and light emission having high design quality can be realized.

Further, the amount of light of the visible light emitted from the vehicle glass 12 is attenuated as the excitation light penetrates inward, and therefore adjusting the amount of light of the excitation light such that the light does not penetrate into the central side of the vehicle glass 12 makes it possible that only the outside portion 12E of the vehicle glass 12 is allowed to emit light, as shown in FIG. 1.

Further, as described above, since a plurality of light sources 11 are provided so as to surround the vehicle glass 12, synchronous irradiation with the excitation light from these light sources 11 makes it possible that the vehicle glass 12 is allowed to emit light over the whole periphery of the outside portion 12E. Further, increasing the amount of light of each light source 11 also makes it possible that the whole surface of the vehicle glass 12 is allowed to emit light.

In this way, in this embodiment, for example, allowing the whole outside portion 12E or the whole vehicle glass 12 to emit light makes it possible to light all over the inside of the car with high illuminance.

Here, the vehicle glass 12 is such that the area where light is emitted synchronously by irradiation with the excitation light from the light sources 11 is 30% or more of the whole glass surface. When the light emitting area of the vehicle glass 12 is less than 30%, the car interior is not lighted with sufficient illuminance by the light emission of the vehicle glass 12, making it difficult to utilize the light emission as car interior lighting. Further, the upper limit of the light emitting area is not specifically limited, and is 100%. Further, the light emitting area is preferably 50 to 100%, more preferably 70 to 100%.

Further, the portion of the vehicle glass 12 that emits light means a portion with a brightness of the vehicle glass 12 of 100 cd/m$^2$ or more, as measured at a distance of 35 cm perpendicularly from the light emitting surface using a color and luminance meter ("CS-150" manufactured by KONICA MINOLTA, INC). Accordingly, a site that slightly emits light by irradiation with excitation light is not regarded as a light emitting portion in this description.

Further, synchronous light emission does not have to be perfectly synchronous, and even if light emission occurs, strictly speaking, at different timing, the light emission is defined as "synchronous light emission" when it is recognized to be synchronous light emission by human eyes. It is difficult to measure the brightness of all the points in the light emitting regions instantly and synchronously with a current technique, and therefore, instead, portions are regarded as emitting light synchronously if the portions satisfy a condition when measured by the following procedure. Firstly, the light emitting state of vehicle glass is retained so as to be the same during the measurement. Next, lines are drawn on the vehicle glass using a marker so that the vehicle glass is divided into 10 vertically and horizontally to make 100 points of measurement regions. The lines, when drawn with a marker, are drawn so that the intervals between vertical lines and the intervals between horizontal lines are uniform as much as possible. All of the measurement regions with a brightness of the center where the diagonal lines intersect with each other in each measurement region made by the aforementioned procedure of 100 cd/m$^2$ or more, as measured at a distance of 35 cm perpendicularly from the light emitting surface using a color and luminance meter ("CS-150" manufactured by KONICA MINOLTA, INC), are regarded as "synchronously light emitting portions."

Accordingly, when the vehicle glass 12 is irradiated with scanning light, as will be described later, light emission from portions in the vehicle glass 12 which are irradiated with the excitation light at different timing from each other can also be regarded as emitting light synchronously.

Further, the vehicle glass 12, when used as a window glass such as, for example, the aforementioned window glass for a roof, has a function of opening and shutting an opening of a vehicle by slide movement or other method in many cases, and when the opening is opened, the vehicle glass is stored inside the roof or other place and has a lot of portions not exposed outside. Accordingly, the "whole glass surface" in this description means the total area of the glass portions exposed on the side of the inside of a vehicle when the vehicle glass 12 is in a most closed state.

Further, in this embodiment, one or both of the on-off switch for switching on and off and the light amount switch for controlling the amount of light for each light source 11 may be provided. The on-off switch and the light amount switch may be manually switchable, or may be automatically switchable or automatically adjustable depending on, for example, the opening/closing status of doors, the driving status, and the like. When the on-off of each light source 11 can be switched, or the amount of light of each light source 11 can appropriately be adjusted, the light emitting regions in the vehicle glass 12 and the light emission brightness can thereby be adjusted, enabling the lighting device to, for example, allow the whole surface of the vehicle glass 12 to emit light or allow a part of the surface of the vehicle glass 12 to emit light.

However, in this embodiment, the vehicle glass 12 needs to emit light synchronously in an area of 30% or more, as described above, in order to be utilized as a lighting device. Accordingly, when the light emitting area can be adjusted, the vehicle glass 12 needs to emit light in an area of 30% or more (preferably 50 to 100%, more preferably 70 to 100%) by setting within at least a part of the adjustment range.

Further, in cars, for example, in the case where a detector that detects the opening and closing state of a door for a car, such as a side door, is provided, or other cases, when it is detected by the detector that any of doors is opened, the lighting device 10 may allow the excitation light to be emitted from the light sources 11 to allow the vehicle glass 12 to emit light. However, also in such a case, the light sources 11 need to be controlled so that light is emitted in an area of 30% or more (an area of preferably 50 to 100%, more preferably 70 to 100%) of the whole glass surface of the vehicle glass 12 to allow the vehicle glass 12 to emit light. As the detector, a door courtesy switch, a position sensor that detects a door position, or the like may be used.

Meanwhile, in the case where it is detected that all the doors of a car are closed from the state in which any one of the doors is opened, or other cases, emission of the excitation light from the light sources 11 may be stopped, thereby stopping lighting by the lighting device 10.

As described above, in the first embodiment, utilization of the vehicle glass as a lighting device enables lighting the whole car interior with high illuminance without narrowing the car interior space.

In the first embodiment described above, a plurality of light sources are provided in the periphery of the vehicle glass, but the number thereof is not limited when at least one is provided, as long as the light emitting area can be made 30% or more. Further, the light sources do not have to surround the vehicle glass. That is, when the outside portion 12E is allowed to emit light, there is no need to emit light over the whole periphery of the outside portion 12E, and some parts of the outside portion 12E may be allowed to emit light. When the light emitting portions in the vehicle glass 12 are some parts in the vehicle glass, a portion other than the outside portion 12E may emit light, and, for example, a portion on the central side may emit light. In such a case, for example, a light source may be provided at the central portion in the vehicle glass 12.

Further, in this embodiment, a car interior light may be provided separately from the lighting device 10 inside a car, and the lighting device 10 may be used as an auxiliary light; or a car interior light other than the lighting device 10 does not have to be provided inside a car.

Figure 3:
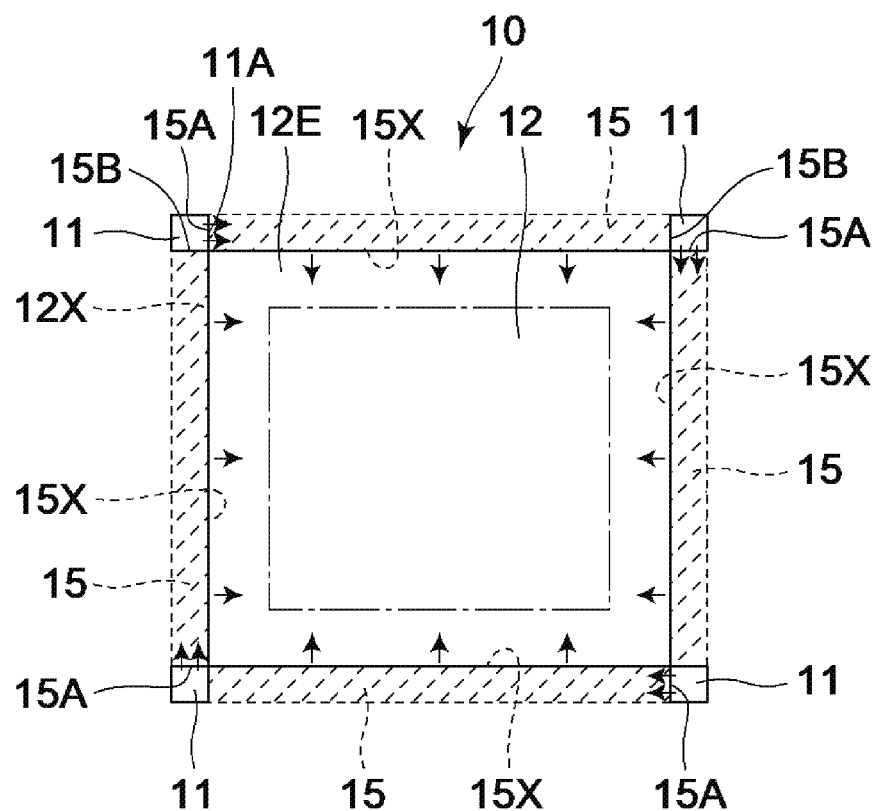
FIG. 3 is a schematic plan view showing a lighting device according to the second embodiment of the present invention.
Figure 4:
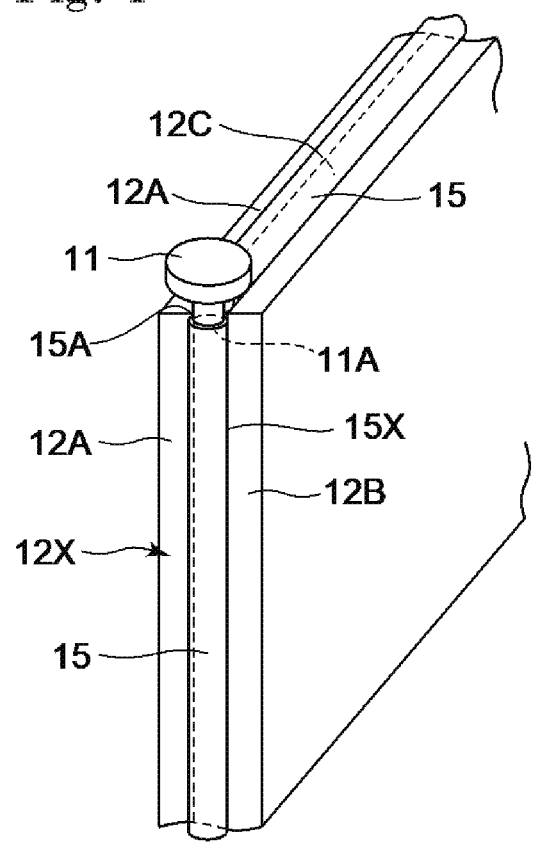
FIG. 4 is a perspective view showing the detailed structure of a lighting device according to the second embodiment of the present invention.

FIGS. 3 and 4 show a lighting device according to the second embodiment of the present invention. The lighting device 10 according to the second embodiment includes light guides 15 in addition to the light sources 11 and the vehicle glass 12. The difference of the lighting device according to the second embodiment from the first embodiment will be described below.

In this embodiment, the light guides 15 are provided along the outer peripheral surface 12X of the vehicle glass 12. The light guides 15 are provided so as to surround the vehicle glass 12, more specifically, provided so as to surround the whole periphery of the vehicle glass 12. For example, a plurality of light guides 15 are provided, and in a square-shaped vehicle glass 12, four light guides with one light guide for each side may be provided, or the light guides may be disposed in another form. Use of the light guides can make the configuration of the lighting device simple without narrowing the interior space.

The output end 11A of a light source 11 is provided at an end part 15A of each light guide 15 so as to be opposed to the end part, and excitation light emitted from the light source 11 enters the light guide 15 through the end part 15A thereof. The light guide 15 needs only to be able to radiate the excitation light that has entered at the end part 15A from a side surface 15X of the light guide 15. Specifically, side emission type optical fibers may be used. Examples of the side emission type optical fibers include optical fibers comprised of core and clad with light scatterers or the like dispersed therein.

The excitation light radiated from the side surface 15X of the light guide 15 enters the inside of the vehicle glass 12 by the outer peripheral surface 12X side of the vehicle glass 12. The vehicle glass 12 emits visible light through incident radiation of the excitation light.

According to the aforementioned configuration, the vehicle glass 12 can allow, for example, the outside portion 12E to emit light also in this embodiment, in the same manner as in the first embodiment. Further, adjusting the amount of light of excitation light entering each light guide 15 or appropriately selecting the light sources 11 to emit light makes it possible that the whole surface of the vehicle glass 12 is allowed to emit light, or alternatively makes it possible that the light emitting regions are selected appropriately.

Also in this embodiment, the vehicle glass 12 is such that the area where light is emitted synchronously by irradiation with excitation light from the light sources 11 is 30% or more of the whole glass surface, preferably 50 to 100%, more preferably 70 to 100%.

Further, as shown in FIG. 4, the light guide 15 may be configured so that the side surface 15X is opposed to or in contact with the light emitting layer of the vehicle glass 12 (in FIG. 2, the interlayer 12C), for enhancing the incidence efficiency to the vehicle glass 12. Further, when the interlayer 12C provided between the two transparent plates 12A and 12B has a resin film composed of a light emitting layer, the light guide 15 may be disposed between the two transparent plates 12A and 12B on the outer peripheral surface 12X or in the vicinity of the outer peripheral surface 12X. In this case, the light guide 15 may be disposed, for example, so as to be embedded in the interlayer 12C.

Since the portion of the side surface 15X of the light guide 15 that is not opposed to the vehicle glass 12 is not required to radiate the excitation light, a film that absorbs or reflects excitation light may be formed thereon. Specifically, a film containing an ultraviolet absorber or the like may be formed thereon.

In the configuration described above, the light guides 15 are provided over the whole circumference of the outer periphery of the vehicle glass 12, but the light guides 15 may be provided along some parts of the outer periphery. The configuration may be such that some parts of the outside portion 12E emit light. Further, a plurality of light guides 15 are provided, but any number of light guides may be provided, as long as at least one is provided. For example, in the case of one light guide, the light guide 15 may be provided along the outer peripheral surface 12X over the whole circumference of the vehicle glass 12 or along a part of the outer peripheral surface 12X of the vehicle glass 12.

Further, in the second embodiment, the excitation light emitted from the light source 11 enters only through the one end part 15A of the light guide 15, but the excitation light emitted from the light source 11 may enter through each of the both end parts 15A and 15B.

Figure 5:
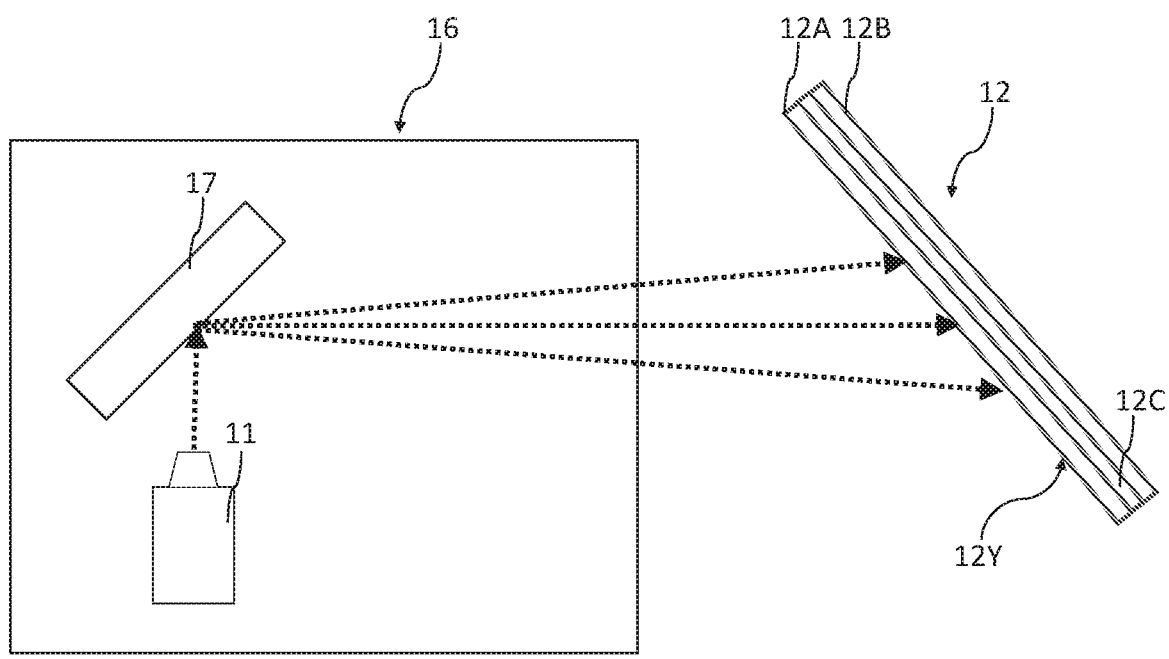
FIG. 5 is a schematic diagram showing a lighting device according to the third embodiment of the present invention.

Next, the third embodiment of the present invention will be described by referring to FIG. 5. In the first and the second embodiments described above, modes in which the excitation light from the light sources 11 is incident from the outer peripheral surface 12X sides of the vehicle glass 12 have been shown, but the vehicle glass 12 is allowed to emit light by the excitation light that is incident from the surface 12Y on the car interior side of the vehicle glass 12 in the third embodiment. The difference of the third embodiment from the first and the second embodiments will be described below.

In this embodiment, a light source unit 16 including a MEMS (Micro Electro Mechanical Systems) mirror 17 is used in addition to the light source 11 from which the excitation light is emitted. The light source unit 16 is disposed at any position without specific limitation, as long as it is disposed at a position where the vehicle glass 12 provided at a roof can be irradiated with the excitation light inside a car, and may be provided, for example, on the roof or on the underside of the roof.

The MEMS mirror 17 is, for example, swingable about two axes, and irradiates the vehicle glass 12 with the light from the light source 11 with scanning. In such a case, the vehicle glass 12 is irradiated in a desired pattern with the excitation light from the light source 11 as scanning light via the MEMS mirror 17 the drive of which is controlled. Portions irradiated with the excitation light in the vehicle glass 12 emit light, and the vehicle glass 12 can be used as lighting by the light emission.

In this embodiment, in the case when the MEMS mirror 17 is used, a desired portion of the vehicle glass 12 can be allowed to emit light by appropriately controlling the MEMS mirror 17.

The light source unit 16 is controlled so that the light emitting area of the vehicle glass 12 is 30% or more (preferably 50 to 100%, more preferably 70 to 100%) also in this embodiment, in the same manner as in the first and the second embodiments. Accordingly, the vehicle glass 12 can be utilized as lighting also in this embodiment, in the same manner as in the first and the second embodiments, so that the whole car interior is lighted with high illuminance. Further, since the light source utilizing the MEMS mirror is generally small, use of the MEMS mirror enables using the vehicle glass as a lighting device almost without narrowing the interior space of the car.

Any light source unit other than the light source unit with the MEMS mirror 17 may be used as the light source unit in this embodiment, as long as it can irradiate the surface 12Y with the excitation light. Examples of such a light source unit may include a light source unit that emits scanning light other than the light source unit with the MEMS mirror 17. Since such a light source unit that emits scanning light is generally small, the light source unit enables utilizing the vehicle glass as lighting without occupying a large space inside the car, in similar to the light source unit with the MEMS mirror.

Further, the light source unit may be a light source unit capable of irradiating the vehicle glass with the excitation light as beam light. The beam light irradiates all portions of the vehicle glass that emit light at the same timing, and no scanning shift or the like occurs as in the case of using scanning light.

Examples of the light source unit other than the light source unit with the MEMS mirror include those utilizing the DMD (Digital Micromirror Device) method using DLP (Digital Light Processing), LCOS (Liquid crystal on silicon), or the like.

Further, the light source unit may be a light source unit that is provided with a diffusion lens, a diffusion mirror, or the like, and diffuses the excitation light emitted from the light source to irradiate the surface 12Y. Use of such a light source unit enables irradiation of the surface 12Y of the vehicle glass 12 over a wide range with the excitation light from the light source.

Further, in the aforementioned descriptions, the vehicle glass 12 is used as the window glass for a car, but may be used as window glass for other vehicles. Examples of such vehicles include various vehicles including railway vehicles such as electric trains, steam-locomotive pulled trains, and trains, forklifts, heavy machineries for civil engineering such as excavators, carts, and amusement park vehicles. Further, it may be employed in ships, airplanes, and the like other than the aforementioned vehicles.

Further, in the description above, the window glass for a roof provided at a roof of a vehicle has been illustrated, but the vehicle glass 12 may be used as a window glass other than the window glass for a roof. For example, the vehicle glass may be a window glass provided at a side surface, a front surface, or a rear surface of a car or other vehicles. For example, the vehicle glass may be used as a windshield, a rear glass, a side glass, or the like in cars. However, in cars, the vehicle glass is preferably used as a rear glass, a side glass, or a window glass for a roof, and among these, the vehicle glass is most preferably a window glass for a roof. The side glass may be a front side glass or a rear side glass.

In the case when the vehicle glass used as a lighting device is a window glass for a roof of a car, the light source 11 is preferably provided at a position higher than that of a steering wheel of the car, and is more preferably provided at a roof, for example, as shown in the first and the second embodiments, from the viewpoint of safety of drivers and fellow passengers. Similarly, in the case when the vehicle glass used as a lighting device is a side glass of a car, the light source is preferably provided on the interior side of a side door of the car from the viewpoint of safety of drivers and fellow passengers.

Further, in the same vehicle (for example, car interior), only a window glass may be utilized as the lighting device described above, but two or more window glasses may be utilized each as the lighting device described above.

Further, in this embodiment, the visible light emitted from each window glass is visibly recognizable also from the outside. Accordingly, by allowing each window glass to emit light as the lighting device described above, the window glass can also be utilized as lighting that indicates the width, the height, or the like of the vehicle itself toward the outside of the vehicle. For example, in the case when the side glasses on both right and left sides are utilized as a lighting device in a car, the side glasses can also be utilized as a width indicator that indicates the width of the car.

Modes in which the vehicle glass 12 is, as described above, used as a window glass for dividing the inside of a vehicle (car interior) from the outside of the vehicle have been described, but further, the vehicle glass may be used in other form, besides the window glass. Specifically, the vehicle glass 12 may be glass for dividing the interior space. Also in such a case, the excitation light may enter from the outer peripheral surface of the vehicle glass, in similar to the first and the second embodiments, or the excitation light may enter from any one of both surfaces of the vehicle glass, in similar to the third embodiment. In the case when the excitation light enters from the outer peripheral surface or any one of both surfaces of such vehicle glass, the configuration thereof is as described above.

[Vehicle Glass]

Next, the vehicle glass used in the present invention will be described in detail. The vehicle glass used in the present invention may be composed of a single layer or may have a multilayer structure having two or more layers. Further, in the vehicle glass, it is preferable that at least one layer is a transparent plate. The transparent plate may be composed of any one of inorganic glass and organic glass. The organic glass is so-called resin glass. The vehicle glass having a multilayer structure may include one transparent plate or may include two or more transparent plates. Further, in the vehicle glass, such a transparent plate may contain a fluorescent material and serve as a light emitting layer that emits light through incident radiation of excitation light, or a layer other than the transparent plate may contain a fluorescent material and serve as a light emitting layer.

Further, the vehicle glass preferably has a multilayer structure comprising a laminate of at least one transparent plate and a resin film, and it is more preferable that the resin film contains a resin and a fluorescent material to serve as a light emitting layer in the multilayer structure.

Further, the light emitting layer is not limited to the resin film and the transparent plate mentioned above and may be a fluorescent material coating formed by vacuum vapor deposition, sputtering, or the like of a fluorescent material. The fluorescent material coating may be formed, for example, on at least one surface of the transparent plate.

(Fluorescent Material)

The fluorescent material emits visible light through incident radiation of excitation light, more specifically, absorbs the excitation light irradiated from the aforementioned light source to emit visible light having a wavelength longer than that of the excitation light. Further, the fluorescent material may be a material that emits so-called phosphorescence by irradiation with the excitation light.

Specifically, examples of the aforementioned fluorescent material include a lanthanoid complex having a ligand containing a halogen atom since it can exert high luminescence. Among lanthanoid complexes, the lanthanoid complex having a ligand containing a halogen atom emits light with high emission intensity by irradiation with light rays. Examples of the lanthanoid complex having a ligand containing a halogen atom include a lanthanoid complex having a monodentate ligand containing a halogen atom and a lanthanoid complex having a multidentate ligand containing a halogen atom, such as a lanthanoid complex having a bidentate ligand containing a halogen atom, a lanthanoid complex having a tridentate ligand containing a halogen atom, a lanthanoid complex having a tetradentate ligand containing a halogen atom, a lanthanoid complex having a pentadentate ligand containing a halogen atom, and a lanthanoid complex having a hexadentate ligand containing a halogen atom.

Among these, the lanthanoid complex having a bidentate ligand containing a halogen atom or the lanthanoid complex having a tridentate ligand containing a halogen atom can emit visible light with high emission intensity by irradiation with light at a wavelength of 300 to 410 nm.

Further, the lanthanoid complex having a bidentate ligand containing a halogen atom or the lanthanoid complex having a tridentate ligand containing a halogen atom also has excellent heat resistance. Since vehicle glass is often used under high-temperature condition due to irradiation with infrared rays of sunlight, use of the lanthanoid complex having a bidentate ligand containing a halogen atom or the lanthanoid complex having a tridentate ligand containing a halogen atom can prevent deterioration of the fluorescent material.

In this description, the lanthanoid includes lanthanum, cerium, praseodymium, neodymium, promethium, samarium, europium, gadolinium, terbium, dysprosium, holmium, erbium, thulium, ytterbium, or lutetium. For obtaining still higher emission intensity, the lanthanoid is preferably neodymium, europium, or terbium, more preferably europium or terbium, further preferably europium.

Examples of the bidentate ligand containing a halogen atom include a ligand having a structure represented by formula (1) below and a ligand having a structure represented by formula (2) below.

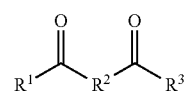

(1)

In formula (1) above, $R^1$ and $R^3$ each represent an organic group, at least one of $R^1$ and $R^3$ is an organic group containing a halogen atom, and $R^2$ represents a linear organic group having one or more carbon atoms. $R^1$ and $R^3$ above are each preferably a hydrocarbon group, more preferably a hydrocarbon group having 1 to 10 carbon atoms, further preferably a hydrocarbon group having 1 to 5 carbon atoms, particularly preferably a hydrocarbon group having 1 to 3 carbon atoms. The hydrogen atoms in the aforementioned hydrocarbon group may be partially replaced by atoms other than hydrogen atoms and functional groups. Examples of the hydrocarbon group having 1 to 3 carbon atoms include a methyl group, an ethyl group, and a propyl group, with no hydrogen atoms replaced, and a methyl group, an ethyl group, and a propyl group, with the hydrogen atoms partially replaced by halogen atoms. Fluorine atoms, chlorine atoms, bromine atoms, and iodine atoms can be used as the halogen atoms that partially replace the hydrogen atoms of the methyl group, the ethyl group, and the propyl group. As the hydrocarbon group having 1 to 3 carbon atoms, a methyl group, an ethyl group, and a propyl group, with the hydrogen atoms partially replaced by halogen atoms are preferable, and trifluoromethyl groups are more preferable, since they emit light with high emission intensity.

$R^2$ above is preferably an alkylene group having one or more carbon atoms, more preferably an alkylene group having 1 to 5 carbon atoms, most preferably a methylene group having one carbon atom. The alkylene group having one or more carbon atoms may have hydrogen atoms partially replaced by atoms other than the hydrogen atoms and functional groups.

The lanthanoid complex having a ligand containing a halogen atom may have at least one ligand containing a halogen atom and may have a ligand containing no halogen atoms. Examples of the ligand containing no halogen atoms include a ligand that is the same as the ligand of formula (1) above except for containing no halogen atoms, and a ligand having a structure represented by formula (2) to (8) below. The ligand having a structure represented by formula (2) to (8) below may have hydrogen atoms partially or entirely replaced by —COOR, —SO₃, —NO₂, —OH, an alkyl group, —NH₂, and the like.

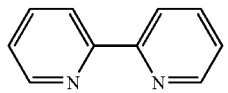
(2)

In formula (2) above, two Ns may be located at any positions in the bipyridine skeleton. For example, the two Ns are located at the 2- and 2'-positions, the 3- and 3'-positions, the 4- and 4'-positions, the 2- and 3'-positions, the 2- and 4'-positions, or the 3- and 4'-positions in the bipyridine skeleton. Among these, the two Ns are preferably located at the 2- and 2'-positions.

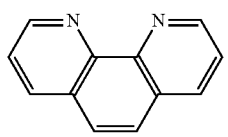
(3)

In formula (3) above, the two Ns may be located at any positions in the bipyridine skeleton. Among these, the two Ns are preferably located at the 1- and 10-positions.

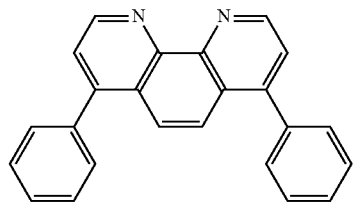
(4)

In formula (4) above, the two Ns may be located at any positions in the bipyridine skeleton. Among these, the two Ns are preferably located at the 1- and 10-positions.

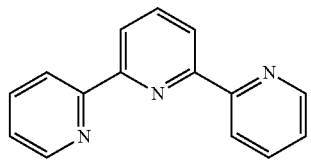
(5)

In formula (5) above, the three Ns may be located at any positions in the terpyridine skeleton.

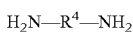
(6)

In formula (6) above, $R^4$ positioned at the center represents a linear organic group having one or more carbon atoms.

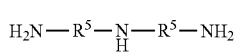
(7)

In formula (7) above, two $R^5$s each represent a linear organic group having one or more carbon atoms.

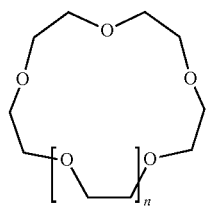
(8)

In formula (8) above, n represents an integer of 1 or 2.

Examples of the lanthanoid complex having a bidentate ligand containing a halogen atom include tris(trifluoroacetylacetone)phenanthroline europium (Eu(TFA)₃phen), tris(trifluoroacetylacetone)diphenylphenanthroline europium (Eu(TFA)₃dpphen), tris(hexafluoroacetylacetone)diphenylphenanthroline europium, tris(hexafluoroacetylacetone) bis(triphenylphosphine) europium, tris(trifluoroacetylacetone) 2,2'-bipyridine europium, tris(hexafluoroacetylacetone)2,2'-bipyridine europium, tris(5,5,6,6,7,7,7-heptafluoro-2,4-pentanedionate)2,2'-bipyridine europium ([Eu(FPD)₃]bpy), tris(trifluoroacetylacetone)3,4,7,8-tetramethyl-1,10-phenanthroline europium ([Eu(TFA)₃]tmphen), tris(5,5,6,6,7,7,7-heptafluoro-2,4-pentanedionate)phenanthroline europium ([Eu(FPD)₃]phen), terpyridine trifluoroacetylacetone europium, and terpyridine hexafluoroacetylacetone europium.

Examples of the lanthanoid complex having a bidentate ligand containing a halogen atom additionally include tris(trifluoroacetylacetone)phenanthroline terbium (Tb(TFA)$_3$phen), tris(trifluoroacetylacetone)diphenylphenanthroline terbium (Tb(TFA)$_3$dpphen), tris(hexafluoroacetylacetone)diphenylphenanthroline terbium, tris(hexafluoroacetylacetone)bis(triphenylphosphine) terbium, tris(trifluoroacetylacetone)2,2'-bipyridine terbium, tris(hexafluoroacetylacetone)2,2'-bipyridine terbium, tris(5,5,6,6,7,7,7-heptafluoro-2,4-pentanedionate)2,2'-bipyridine terbium ([Tb(FPD)$_3$]bpy), tris(trifluoroacetylacetone)3,4,7,8-tetramethyl-1,10-phenanthroline terbium ([Tb(TFA)$_3$]tmphen), tris(5,5,6,6,7,7,7-heptafluoro-2,4-pentanedionate)phenanthroline terbium ([Tb(FPD)$_3$]phen), terpyridine trifluoroacetylacetone terbium, and terpyridine hexafluoroacetylacetone terbium.

As the halogen atom contained in the ligand of the lanthanoid complex, a fluorine atom, a chlorine atom, a bromine atom, or an iodine atom can be used. Among these, a fluorine atom is suitable for stabilizing the structure of the ligand.

Among the lanthanoid complex having a bidentate ligand containing a halogen atom or the lanthanoid complex having a tridentate ligand containing a halogen atom, a lanthanoid complex having a bidentate ligand containing a halogen atom and having an acetylacetone skeleton is particularly suitable due to its excellent initial luminescence.

Examples of the lanthanoid complex having a bidentate ligand containing a halogen atom and having an acetylacetone skeleton include Eu(TFA)$_3$phen, Eu(TFA)$_3$dpphen, Eu(HFA)$_3$phen, [Eu(FPD)$_3$]bpy, [Eu(TFA)$_3$]tmphen, and [Eu(FPD)$_3$]phen. The structures of such a lanthanoid complex having a bidentate ligand containing a halogen atom and having an acetylacetone skeleton are shown below.

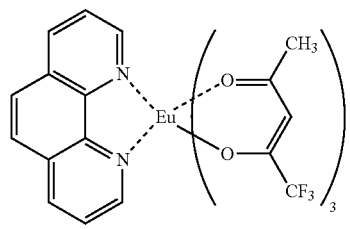

Eu(TFA)$_3$phen

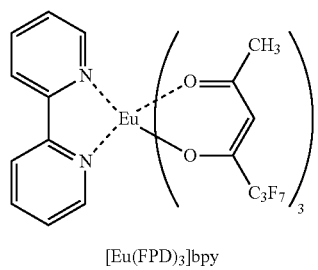

[Eu(FPD)$_3$]bpy

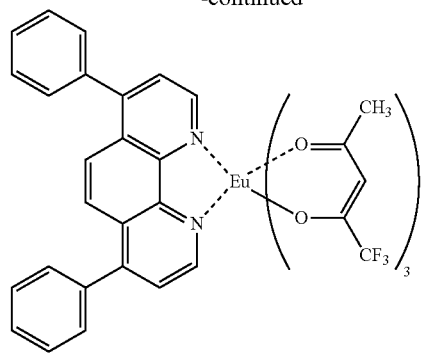

Eu(TFA)$_3$dpphen

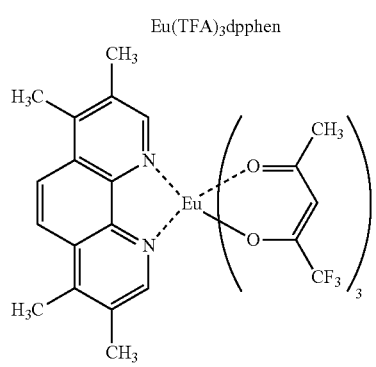

[Eu(TFA)$_3$]tmphen

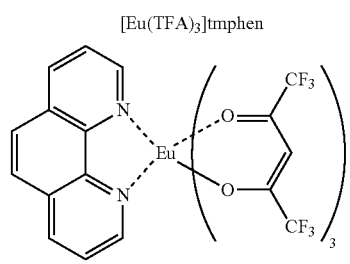

Eu(HFA)$_3$phen

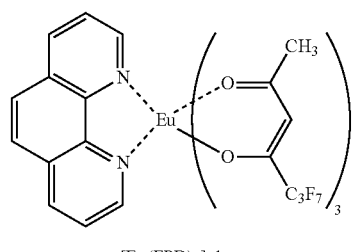

[Eu(FPD)$_3$]phen

Examples of the lanthanoid complex having a bidentate ligand containing a halogen atom and having an acetylacetone skeleton additionally include Tb(TFA)$_3$phen, Tb(TFA)$_3$dpphen, Tb(HFA)$_3$phen, [Tb(FPD)$_3$]bpy, [Tb(TFA)$_3$]tmphen, and [Tb(FPD)$_3$]phen.

The lanthanoid complex having a ligand containing a halogen atom is preferably particulate. The particulate form makes it easier to finely disperse the lanthanoid complex having a ligand containing a halogen atom in the light emitting layer.

When the lanthanoid complex having a ligand containing a halogen atom is particulate, the lower limit of the average particle size of the lanthanoid complex is preferably 0.01 μm, and the upper limit thereof is preferably 10 μm. The lower limit is more preferably 0.03 μm, and the upper limit thereof is more preferably 1 μm.

As the aforementioned fluorescent material, a fluorescent material having a terephthalic acid ester structure can be also used. The fluorescent material having a terephthalic acid ester structure emits light by irradiation with light rays.

Examples of the fluorescent material having a terephthalic acid ester structure include a compound having a structure represented by formula (9) below and a compound having a structure represented by formula (10) below. One of these may be used singly, or two or more of these may be used.

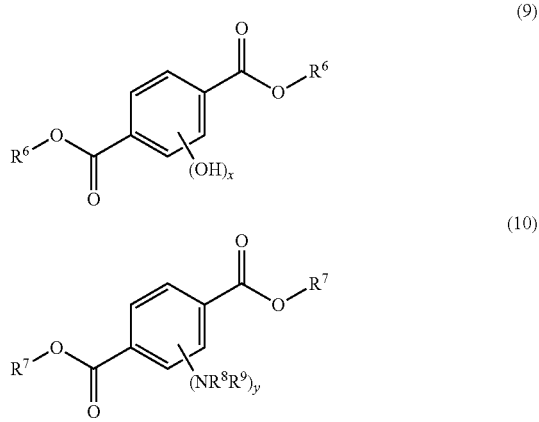

In formula (9) above, $R^6$ represents an organic group, and x is 1, 2, 3, or 4.

For further enhancing the visible light transmittance of the vehicle glass, x is preferably 1 or 2, more preferably has a hydroxyl group at the 2- or 5-position of the benzene ring, and further preferably has hydroxyl groups at the 2- and 5-positions of the benzene ring.

The organic group of $R^6$ is preferably a hydrocarbon group, more preferably a hydrocarbon group having 1 to 10 carbon atoms, further preferably a hydrocarbon group having 1 to 5 carbon atoms, particularly preferably a hydrocarbon group having 1 to 3 carbon atoms. When the hydrocarbon group has 10 or less carbon atoms, the fluorescent material having a terephthalic acid ester structure can be easily dispersed in the light emitting layer. The hydrocarbon group is preferably an alkyl group.

Examples of the compound having a structure represented by formula (9) above include diethyl-2,5-dihydroxyterephthalate and dimethyl-2,5-dihydroxyterephthalate. Among these, the compound having a structure represented by formula (9) above is preferably diethyl-2,5-dihydroxyl terephthalate ("diethyl 2,5-dihydroxyterephthalate" available from Aldrich).

In formula (10) above, $R^7$ represents an organic group, $R^8$ and $R^9$ each represent a hydrogen atom or an organic group, and y is 1, 2, 3, or 4.

The organic group of $R^7$ is preferably a hydrocarbon group, more preferably a hydrocarbon group having 1 to 10 carbon atoms, further preferably a hydrocarbon group having 1 to 5 carbon atoms, particularly preferably a hydrocarbon group having 1 to 3 carbon atoms. When the number of carbon atoms in the hydrocarbon group is equal to or less than the upper limit, the fluorescent material having a terephthalic acid ester structure can be easily dispersed in the light emitting layer. The hydrocarbon group is preferably an alkyl group.

In formula (10) above, $NR^8R^9$ is an amino group. $R^8$ and $R^9$ are each preferably a hydrogen atom. Of the hydrogen atoms in the benzene ring of the compound having a structure represented by formula (10) above, one hydrogen atom may be replaced with the aforementioned amino group, two hydrogen atoms may be replaced with each the aforementioned amino group, three hydrogen atoms may be replaced with each the aforementioned amino group, and four hydrogen atoms may be replaced with each the aforementioned amino group.

The compound having a structure represented by formula (10) above is preferably diethyl-2,5-diaminoterephthalate (for example, available from Aldrich).

(Resin Film)

As described above, a resin film serving as the light emitting layer is preferably provided in the vehicle glass. Further, the vehicle glass preferably has a laminated glass structure in which an interlayer is provided between two transparent plates, and the two transparent plates are bonded together via the interlayer.

In the laminated glass structure, the interlayer is composed of a single layer of a resin film, and the resin film preferably serves as the light emitting layer. Further, two or more layers of resin films may be provided in the interlayer, and at least one of the plurality of resin films may serve as the light emitting layer.

Further, the resin film serving as the light emitting layer does not necessarily constitute the interlayer, and may be provided, for example, on the surface of any one of the transparent plates that is opposite to the surface on the interlayer side, in the laminated glass structure. Further, in the case when one transparent plate is provided in the vehicle glass, the resin film may be provided on any one of the surfaces of the single layer transparent plate.

In the case when the resin film serving as the light emitting layer is provided on the opposite surface in the laminated glass structure or any one surface of the single layer transparent plate, a sheet-shaped member having the light emitting layer (resin film) may be bonded to the surface of the single layer glass or the laminated glass structure via an adhesive, a pressure-sensitive adhesive, or the like. Thus, the light emitting layer can be provided on the vehicle glass by so-called post bonding by attaching such a sheet-shaped member onto existing vehicle glass.

The resin film serving as the light emitting layer contains a resin and a fluorescent material, in which the fluorescent material is generally dispersed in the resin. The fluorescent material may be dispersed throughout the light emitting layer. The resin used in the resin film is preferably a thermoplastic resin. Use of the thermoplastic resin makes it easy for the resin film to exert functions as an adhesive layer and facilitates bonding to the transparent plates or the like in the case of constituting an interlayer, as described above.

In the case when the resin film contains a fluorescent material, the content of the fluorescent material is preferably 0.001 parts by mass or more, more preferably 0.05 parts by mass or more, further preferably 0.1 parts by mass or more, based on 100 parts by mass of the resin. Adjusting the content of the fluorescent material to such a lower limit or more enables the vehicle glass to sufficiently emit light. Further, the content of the fluorescent material is preferably 10 parts by mass or less, more preferably 3 parts by mass or less, further preferably 1.5 parts by mass or less. Adjusting the content to such an upper limit or less facilitates ensuring the transparency of the vehicle glass.

The thickness of the resin film is not specifically limited, but is, for example, 0.1 to 2 mm, preferably 0.2 to 1 mm. Adjusting the thickness of the resin film to such a range enables sufficient light emission brightness to be ensured without impairing the transparency of the vehicle glass.

Further, the thickness of the interlayer is not specifically limited, but is, for example, 0.1 to 3 mm, preferably 0.2 to 2 mm.

As described above, the resin used in the resin film is preferably a thermoplastic resin. Further, the thermoplastic resin to be used in the resin film is not specifically limited, but examples thereof include a polyvinyl acetal resin, an ethylene-vinyl acetate copolymer resin, an ionomer resin, a polyurethane resin, and a thermoplastic elastomer. Use of such a resin facilitates ensuring the adhesiveness of the resin film to the transparent plates and is thus particularly suitable in the case when the resin film constitutes an interlayer.

In the resin film, one of such thermoplastic resins may be used singly or two or more of them may be used in combination. Among these, a polyvinyl acetal resin is particularly suitable in that excellent adhesiveness to inorganic glass is exerted in the case when a plasticizer is contained in the resin film.

In the case when the resin film contains a thermoplastic resin, the resin film may further contain a plasticizer. The resin film is made flexible by containing a plasticizer therein, as a result of which, the vehicle glass is made flexible. Further, the adhesiveness to the transparent plates can be enhanced, particularly in the case when the transparent plates are inorganic glass. In the case of using a polyvinyl acetal resin as the thermoplastic resin, the plasticizer is particularly effective when contained in the layer.

Examples of the plasticizer include organic ester plasticizers such as monobasic organic acid esters and polybasic organic acid esters, and phosphoric acid plasticizers such as organic phosphoric acid plasticizers and organic phosphorous acid plasticizers. Among these, organic ester plasticizers are preferable, and triethylene glycol-di-2-ethyl hexanoate (3GO) is particularly suitable.

The content of the plasticizer is not specifically limited, but the lower limit is preferably 30 parts by mass, and the upper limit is preferably 70 parts by mass, relative to 100 parts by mass of the thermoplastic resin. In the case when the content of the plasticizer is 30 parts by mass or more, the vehicle glass is made appropriately flexible, so that the handleability is made good. Further, in the case when the content of the plasticizer is 70 parts by mass or less, separation of the plasticizer from the resin film is prevented. The lower limit of the content of the plasticizer is more preferably 35 parts by mass, and the upper limit is more preferably 63 parts by mass.

Further, in the case when the resin film of the present invention contains a thermoplastic resin, the thermoplastic resin, or the thermoplastic resin and the plasticizer serve as main components, and the total amount of the thermoplastic resin and the plasticizer is generally 70 mass % or more, preferably 80 mass % or more, further preferably 90 mass % or more, based on the total amount of the resin film.

The resin film not serving as the light emitting layer is the same as described above, except that it does not contain a fluorescent material. Further, the resin film may contain additives such as antioxidants, adhesion modifiers, ultraviolet absorbers, infrared absorbers, and antistatic agents, as required.

(Transparent Plate)

As the transparent plate, those which can be used for vehicle glass can be used without specific limitation, and inorganic glass and organic glass can be used. The inorganic glass is not specifically limited, but examples thereof include clear glass, float plate glass, polished plate glass, figured glass, net-wired plate glass, line-wired plate glass, and green glass.

Further, as the organic glass, those generally called resin glass are used without specific limitation, but examples thereof include transparent organic glass composed of resins such as polycarbonates, acrylic resins, acrylic copolymer resins, and polyesters.

In the case when the vehicle glass has two or more transparent plates, the plurality of transparent plates may be composed of the same material as each other and may be composed of different materials. For example, in the case when two transparent plates are included, one may be inorganic glass and the other may be organic glass. However, in the case when a plurality of transparent plates are included, the plurality of transparent plates are preferably all inorganic glass or all organic glass.

Further, the thickness of each transparent plate is not specifically limited, but is, for example, about 0.1 to 15 mm, preferably 0.5 to 5 mm. In the case when the vehicle glass has a plurality of transparent plates, the thickness of each transparent plate may be the same or different.

As described above, in the vehicle glass, the transparent plate may serve as the light emitting layer that emits visible light. In the case when the transparent plate serves as the light emitting layer, the transparent plate itself contains the fluorescent material. In such a case, the fluorescent material may be dispersed in the inorganic material constituting inorganic glass or the organic material (resin) constituting organic glass of the transparent plate. Here, the fluorescent material may be dispersed throughout the transparent plate. In the case when the transparent plate itself contains the fluorescent material, the content of the fluorescent material is preferably 0.001 parts by mass or more, more preferably 0.05 parts by mass or more, further preferably 0.1 parts by mass or more, relative to 100 parts by mass of the inorganic material constituting inorganic glass or 100 parts by mass of the resin constituting organic glass. Adjusting the content of the fluorescent material to such a lower limit or more enables the vehicle glass to sufficiently emit light. Further, the content of the fluorescent material is preferably 10 parts by mass or less, more preferably 3 parts by mass or less, further preferably 1.5 parts by mass or less. Adjusting the content of the inorganic material to such an upper limit or less prevents the transparency of the vehicle glass from being impaired by the fluorescent material.

In the case when the transparent plate contains the fluorescent material to serve as the light emitting layer, the vehicle glass may have the laminated glass structure as described above or the transparent plate may be composed of a single layer. In the case of having the laminated glass structure, at least one transparent plate may serve as the light emitting layer.

The vehicle glass may transmit visible light or may be configured not to transmit visible light, but preferably transmits visible light. To transmit visible light means, for example, that the visible light transmittance is 30% or more, preferably 50% or more.

In the case when the vehicle glass is used, for example, as front side glass or windshield for a car, the visible light transmittance is preferably 70% or more, more preferably 75% or more, further preferably 80% or more, for enhancing the transparency of the vehicle glass and ensuring the car safety. Further, the upper limit of the visible light transmittance is not specifically limited and is preferably as high as possible, but is practically preferably 99% or less, more preferably 95% or less. The visible light transmittance means an average of visible light transmittance at 400 to 780 nm and can be measured, for example, using an ultraviolet-visible-infrared spectrophotometer (UH4150, manufactured by Hitachi High-Technologies Corporation) according to JIS R3212.

Further, the vehicle glass emits visible light due to the excitation light incident from the light source, as described above. The visible light is generally light having a wavelength of 400 to 780 nm. Further, the vehicle glass may emit blue, green, red, and other light or may emit white light by mixing light of two or more colors. In the case of mixing light of two or more colors, for example, two or more light emitting layers may be provided, so that each layer emits light of different color for mixing colors, or one light emitting layer may contain two or more fluorescent materials.

Further, the vehicle glass may be provided with a reflective film that reflects visible light or excitation light. The reflective film is preferably provided on the outer side of the vehicle, compared to the light emitting layer (that is, outward of the vehicle). The reflective film may reflect visible light or may reflect excitation light. As the reflective film, a known film such as a metal film, a visible light reflecting film, or the like may be used. Since the reflective film reflects visible light or the like emitted by the light emitting layer, providing the reflective film can further enhance the emission intensity of the vehicle glass.

REFERENCE SIGNS LIST

10: Lighting device
11: Light source
11A: Output end
12: Vehicle glass
12A, 12B: Transparent plate
12C: Interlayer
12E: Outside portion
12X: Outer peripheral surface
12Y: Surface
13: Roof
14: Opening
15: Light guide
15A, 15B: End part
15X: Side surface
16: Light source unit
17: MEMS mirror

The invention claimed is:

1. A lighting device comprising:
a light source configured to irradiate excitation light; and
a vehicle glass configured to emit visible light through incident radiation of the excitation light,
wherein:
the vehicle glass is configured to emit the visible light synchronously in an area of 30% or more by irradiation with the excitation light;
the vehicle glass is window glass for a roof of a vehicle; and
the excitation light from the light source is incident from a surface on a vehicle interior side of the vehicle glass.

2. The lighting device according to claim 1, wherein the vehicle glass is a car glass.

3. The lighting device according to claim 1, wherein the vehicle glass comprises a transparent plate.

4. The lighting device according to claim 3, wherein:
the vehicle glass has a multilayer structure comprising a laminate of at least one transparent plate and a resin film; and
the resin film comprises a resin and a fluorescent material capable of emitting the visible light through incident radiation of the excitation light.

5. A vehicle glass utilization method, comprising:
using a light source irradiating excitation light and a vehicle glass emitting visible light through incident radiation of the excitation light to allow the vehicle glass to emit the visible light synchronously in an area of 30% or more by irradiation with the excitation light, thereby utilizing the vehicle glass as lighting,
wherein:
the vehicle glass is window glass for a roof of a vehicle; and
the excitation light from the light source is incident from a surface on a vehicle interior side of the vehicle glass.

6. The vehicle glass utilization method according to claim 5, wherein the vehicle glass is a car glass.

7. The vehicle glass utilization method according to claim 5, wherein the vehicle glass comprises a transparent plate.

8. The vehicle glass utilization method according to claim 7, wherein:
the vehicle glass has a multilayer structure comprising a laminate of at least one transparent plate and a resin film; and
the resin film comprises a resin and a fluorescent material capable of emitting the visible light through incident radiation of the excitation light.

9. The lighting device according to claim 1, wherein:
the window glass comprises two transparent plates and an interlayer between the two transparent plates, the two transparent plates being bonded together by the interlayer;
the interlayer comprises a resin film which includes a resin and a fluorescent material that is dispersed in the resin; and
the fluorescent material is capable of emitting the visible light through incident radiation of the excitation light.

10. The lighting device according to claim 9, wherein:
the interlayer consists of a single resin film;
the single resin film comprises the resin and the fluorescent material;
both of the two transparent plates are inorganic glass; and
the resin is a thermoplastic resin.

11. The lighting device according to claim 1, wherein the light source is capable of being adjusted so that the vehicle glass is configured to emit the visible light over a whole periphery of an outside portion of the vehicle glass without emitting the visible light at a central side of the vehicle glass.

12. The vehicle glass utilization method according to claim 5, wherein:
the window glass comprises two transparent plates and an interlayer between the two transparent plates, the two transparent plates being bonded together by the interlayer;
the interlayer comprises a resin film which includes a resin and a fluorescent material that is dispersed in the resin; and
the fluorescent material is capable of emitting the visible light through incident radiation of the excitation light.

13. The vehicle glass utilization method according to claim 12, wherein:
the interlayer consists of a single resin film;
the single resin film comprises the resin and the fluorescent material;
both of the two transparent plates are inorganic glass; and
the resin is a thermoplastic resin.

14. The vehicle glass utilization method according to claim 5, wherein the light source is capable of being adjusted so that the vehicle glass is configured to emit the visible light over a whole periphery of an outside portion of the vehicle glass without emitting the visible light at a central side of the vehicle glass.

\* \* \* \* \*